(12) United States Patent
Croft

(10) Patent No.: US 9,610,997 B1
(45) Date of Patent: Apr. 4, 2017

(54) KNEEL PUSH CYCLE APPARATUS

(71) Applicant: Walter Edwin Croft, San Mateo, CA (US)

(72) Inventor: Walter Edwin Croft, San Mateo, CA (US)

( * ) Notice: Subject to any disclaimer, the term of this patent is extended or adjusted under 35 U.S.C. 154(b) by 0 days.

(21) Appl. No.: 14/754,897

(22) Filed: Jun. 30, 2015

Related U.S. Application Data

(60) Provisional application No. 62/018,979, filed on Jun. 30, 2014.

(51) Int. Cl.
*B62M 1/00* (2010.01)
*B62K 5/023* (2013.01)
*B62J 1/28* (2006.01)
*B62K 5/00* (2013.01)

(52) U.S. Cl.
CPC ............... *B62K 5/023* (2013.01); *B62J 1/28* (2013.01); *B62M 1/00* (2013.01); *B62K 2005/001* (2013.01)

(58) Field of Classification Search
CPC ........................... A61H 2003/005; A61H 3/04
USPC .......................................... 280/87.021, 87.03
See application file for complete search history.

(56) References Cited

U.S. PATENT DOCUMENTS

| | | | | |
|---|---|---|---|---|
| 1,615,403 A | * | 1/1927 | Prochaska | B62K 3/002 280/87.021 |
| 1,668,623 A | * | 5/1928 | Avril | B62K 3/002 280/87.021 |
| 4,029,329 A | * | 6/1977 | Chambers | B62K 9/02 280/272 |
| 4,065,145 A | * | 12/1977 | Chambers | A61G 5/00 280/62 |
| 4,239,248 A | * | 12/1980 | Ewers | A61G 5/02 280/270 |
| 5,702,326 A | * | 12/1997 | Renteria | A61H 3/04 135/67 |
| 5,800,317 A | * | 9/1998 | Accetta | A61H 3/04 135/67 |
| 5,839,740 A | * | 11/1998 | Seeger | A61H 3/04 135/67 |
| 6,634,660 B2 | * | 10/2003 | Miller | A61H 3/04 135/67 |
| 7,287,767 B1 | * | 10/2007 | Gomes | B62K 3/16 280/87.021 |
| 7,780,180 B2 | * | 8/2010 | Hoepner | A61H 3/04 280/263 |
| 7,938,413 B2 | * | 5/2011 | Anderson | B62K 3/002 135/65 |
| 7,980,572 B2 | * | 7/2011 | Bennett | A61G 5/00 280/400 |

(Continued)

*Primary Examiner* — Jeffrey J Restifo
(74) *Attorney, Agent, or Firm* — Williams Intellectual Property; Benjamin F. Williams

(57) ABSTRACT

A kneel push cycle apparatus that includes a kneeling pad disposed upon a suspension member coupled to a frame member, said frame member disposed between a directable front wheel and at least one rear wheel, wherein a user is enabled to kneel upon the kneeling pad with one leg and propel the kneel push cycle apparatus at a desired velocity by use of the other leg in striding contact with a ground surface, whereby expedient locomotion and voluble travel is enabled for a user desirous to maintain at least one lower leg off of the ground without bearing weight thereon.

14 Claims, 7 Drawing Sheets

(56) References Cited

U.S. PATENT DOCUMENTS

| | | | | |
|---|---|---|---|---|
| 7,988,163 B2 * | 8/2011 | Accetta | A61G 5/00 135/67 |
| 8,231,133 B2 * | 7/2012 | Walther | B62K 5/023 280/47.35 |
| 8,348,288 B1 * | 1/2013 | Laughon, Sr. | A61G 5/02 280/87.021 |
| 8,523,211 B2 * | 9/2013 | Mailahn | A61H 3/04 280/263 |
| 8,540,256 B1 * | 9/2013 | Simpson | A61H 3/00 135/67 |
| 8,608,184 B2 * | 12/2013 | Janis | A61H 3/04 280/87.021 |
| 8,827,284 B2 * | 9/2014 | Walther | B62K 5/023 280/87.041 |
| 8,857,832 B2 * | 10/2014 | Smith | B62K 21/16 280/263 |
| 8,915,517 B1 * | 12/2014 | Jacobs | A61H 3/04 108/27 |
| 2003/0094779 A1 * | 5/2003 | Miller | A61H 3/04 280/87.021 |
| 2004/0201192 A1 * | 10/2004 | Ramm | B62K 3/002 280/87.021 |
| 2004/0217565 A1 * | 11/2004 | Ramm | B62K 3/002 280/87.01 |
| 2005/0121873 A1 * | 6/2005 | Miller | A61H 3/04 280/87.021 |
| 2006/0033297 A1 * | 2/2006 | Miller | B62K 3/002 280/87.021 |
| 2007/0216122 A1 * | 9/2007 | Cornelius | A61H 3/00 280/87.05 |
| 2008/0079230 A1 * | 4/2008 | Graham | A61G 5/08 280/87.041 |
| 2008/0284125 A1 * | 11/2008 | Ramm | A61H 3/04 280/263 |
| 2009/0058036 A1 * | 3/2009 | Hoepner | A61H 3/04 280/267 |
| 2009/0058037 A1 * | 3/2009 | Accetta | A61G 5/00 280/267 |
| 2010/0007104 A1 * | 1/2010 | Bennett | A61G 5/00 280/7.15 |
| 2011/0109058 A1 * | 5/2011 | Janis | A61H 3/04 280/263 |
| 2011/0298190 A1 * | 12/2011 | Diaz | A61H 3/04 280/87.021 |
| 2012/0000496 A1 * | 1/2012 | Razon | A61H 3/04 135/67 |
| 2012/0043730 A1 * | 2/2012 | Walther | B62K 5/023 280/62 |
| 2012/0048318 A1 * | 3/2012 | Zendzian | A61H 3/04 135/66 |
| 2012/0280467 A1 * | 11/2012 | Walther | B62K 5/023 280/263 |
| 2013/0075997 A1 * | 3/2013 | Mailahn | A61H 3/04 280/263 |
| 2014/0097592 A1 * | 4/2014 | Smith | B62K 5/003 280/267 |
| 2015/0076780 A1 * | 3/2015 | Smith | B62K 5/003 280/87.041 |

* cited by examiner

KNEEL PUSH CYCLE APPARATUS

CROSS-REFERENCE TO RELATED APPLICATIONS

This nonprovisional application claims the benefit of provisional application No. 62/018,979 filed on Jun. 30, 2014.

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of push cycles are known in the prior art. However, what is needed is a kneel push cycle apparatus that includes a kneeling pad disposed upon a suspension member coupled to a frame member, said frame member disposed between a directable front wheel and at least one rear wheel, wherein a user is enabled to kneel upon the kneeling pad with one leg and propel the kneel push cycle apparatus at a desired velocity by use of the other leg in striding contact with a ground surface, whereby expedient locomotion and voluble travel is enabled for a user desirous to maintain at least one lower leg off of the ground without bearing weight thereon.

FIELD OF THE INVENTION

The present invention relates to a kneel push cycle apparatus, and more particularly, to a kneel push cycle apparatus that includes a kneeling pad disposed upon a suspension member coupled to a frame member, said frame member disposed between a directable front wheel and at least one rear wheel, wherein a user is enabled to kneel upon the kneeling pad with one leg and propel the kneel push cycle apparatus at a desired velocity by use of the other leg in striding contact with a ground surface, whereby expedient locomotion and voluble travel is enabled for a user desirous to maintain at least one lower leg off of the ground without bearing weight thereon.

SUMMARY OF THE INVENTION

The general purpose of the kneel push cycle apparatus, described subsequently in greater detail, is to provide a kneel push cycle apparatus which has many novel features that result in a kneel push cycle apparatus which is not anticipated, rendered obvious, suggested, or even implied by prior art, either alone or in combination thereof.

The present kneel push cycle apparatus has been devised to enable assisted and voluble travel of a user riding said kneel push cycle apparatus kneeling upon one knee. The present kneel push cycle apparatus, therefore, enables expedient locomotion of a user with a foot elevated off the ground, whereby travel is enabled for a user having an injured foot or lower leg—the term "lower leg" taken to include all parts of the leg below the knee—said user thereby propelling the present device at a desired velocity by use of the other leg striding against a ground surface.

Thus the present device is usable for patients undergoing convalescence from a foot or lower leg injury, and also for recreational use, as desired, as a kneel push cycle. There are no pedals, chains, gears, or other driving structures common to most cycles seen in the art, and the present invention is powered by use of one leg striding in contact with the ground, said device thence directable by a handle bar disposed to turn a front wheel coupled to a frame member.

The present kneel push cycle apparatus, therefore, includes a frame member disposed angularly between each of at least one rear wheel and a front wheel. The frame member includes a posterior end and an anterior end. The at least one rear wheel is disposed voluble at the posterior end, and the front wheel is disposed centrally voluble between a pair of prongs disposed upon a front fork at the anterior end of the frame member. The front fork is rotatably disposed within a sleeve disposed at the frame member front end whereby the front wheel is pivotal to direct the kneel push cycle apparatus during travel, as desired. In a preferred embodiment herein disclosed, the at least one rear wheel has a diameter smaller than the front wheel whereby the posterior end of the frame member is disposed more proximal a ground surface than the anterior end.

In another embodiment herein disclosed a pair of rear wheels is disposed at either end of an articulated transverse beam whereby greater stability is afforded the kneel push cycle apparatus. Another embodiment of the present kneel push cycle apparatus includes a pair of rear wheels disposed endwise upon a split frame member, as will be described subsequently. Each of these embodiments disposes the pair of rear wheels at the posterior end of the frame member.

Significant to this invention, a kneeling pad is disposed connected to the frame member, said kneeling pad including a front end and a rear end. The kneeling pad presents a surface angularly disposed relative the frame member upon which a user may kneel, said surface approximately parallel with an underlying ground surface. The kneeling pad includes an upward rest disposed angled upwardly at the front end, said upward rest disposed to contact the dorsal side of a user's thigh when riding the kneel push cycle apparatus. In the preferred embodiment, the rear end of the kneeling pad is disposed overhanging the rear wheel. A support bar may be included between the kneeling pad and the frame member, said support bar upholding the kneeling pad.

In an example embodiment of the present invention, the kneeling pad is pivotally connected to the frame member at a pivot joint. In such an embodiment, a suspension member is compressively disposed between the kneeling pad and the frame member in lieu of the support bar, said suspension member enabling absorption of force along an axis normal the frame member where contact between said suspension member and frame member is effected. The suspension member, therefore, increases comfort and stability of a user when riding the present kneel push cycle, particularly over an uneven surface, for example.

In another example embodiment, the kneeling pad may be pivotally connected to the frame member at the pivot joint without either a support bar or a suspension member, wherein the pivot joint is sprung itself to resist and accommodate downward compression of the kneeling pad relative the frame member. The kneeling pad is thus compressible relative the frame member and thereby absorptive of force exerted against the pivot joint itself.

The frame member may include an S-shaped portion and a straight portion. The S-shaped portion is disposed to undulate from a position underneath the straight portion proximal the posterior end to a position above the straight portion more proximal the anterior end. The S-shaped portion may cross from beneath the straight portion above the straight portion at a proximal midpoint, and the pivot joint connecting the kneeling pad to the frame member may be disposed proximal the proximal midpoint. An example embodiment herein disclosed excludes the S-shaped portion of the frame member.

In an example embodiment herein disclosed, a rearward pad is disposed extensible from the posterior end of the kneeling pad. The rearward pad is dispositional to engage against a user's lower back during use of the kneel push cycle apparatus whereby comfort during extended use is increasable, as desired. The rearward pad may assist in supporting a user in an upright and erect position while riding and controlling the present kneel push cycle apparatus.

The rearward pad may be disposed connectable to a seating pad disposed to overlie the kneeling pad, whereby a user may sit upon the seating pad during use of the kneel push cycle apparatus, said user's kneeling leg thereby disposed between the kneeling pad and the seating pad. The seating pad may include a second suspension member for compressive engagement against the weight of a user, as desired, to increase comfort and lessen knocks that might otherwise occur when traveling upon the present kneel push cycle apparatus.

In another example embodiment a pair of rear wheels is contemplated, each of said pair of rear wheels disposed endwise upon an articulated transverse beam. The pair of rear wheels typical of this example embodiment increases the stability of the kneel push cycle apparatus and enables the present kneel push cycle apparatus to remain in an upright position when unattended absent additional support from available objects or surfaces, whereby a user may expediently take to the kneel push cycle apparatus for use, as desired.

In this embodiment, the articulated transverse beam includes an inline bearing wherein each of the pair of rear wheels is enabled angular displacement relative the frame member, whereby centripetal force exerted at said wheels during change of velocity enables reorientation of each of said wheels angled relative the frame member and said wheels are enabled continual contact with a ground surface during the execution of a turn. Thus stability of the device is increased, and tipping during travel is less likely.

The term "inline bearing", as used herein throughout, is taken to include pivotal or rotational action of the wheels in relation to the frame member against action of a spring member whereby righting of the wheels relative the frame is effected by release of the spring member tension subsequent cessation of centripetal force applied at the wheel rims. The term "inline bearing: therefore, is taken to include bearings, torsional bars, and leaf springs, as case may be, as determined by the embodiment practiced.

In another embodiment the pair of rear wheels is disposed endwise at the posterior end of a split frame member. In this embodiment, the frame member includes a pair of parallel portions disposed on either side of a central portion. Each of the pair of rear wheels is disposed endwise upon each of the pair of parallel portions. The kneeling pad is disposed upon the central portion.

In yet another embodiment a pair of kneeling pads is contemplated upon an elongated frame member whereby two passengers may ride the kneel push cycle apparatus concurrently.

Thus has been broadly outlined the more important features of the present kneel push cycle apparatus so that the detailed description thereof that follows may be better understood and in order that the present contribution to the art may be better appreciated.

For better understanding of the kneel push cycle apparatus, its operating advantages and specific objects attained by its uses, refer to the accompanying drawings and description.

BRIEF DESCRIPTION OF THE DRAWINGS

Figures
FIG. 11 is a top view of an example embodiment having each of a pair of rear wheels disposed endwise upon each of a frame frame member and an adjunct member, each of said frame member and adjunct frame member supportable of a kneeling pad for tandem use.
FIG. 12 is a top view of an example embodiment of an alternative split frame member having a pair of rear wheels disposed endwise thereupon.

DETAILED DESCRIPTION OF THE DRAWINGS

Figure 1:
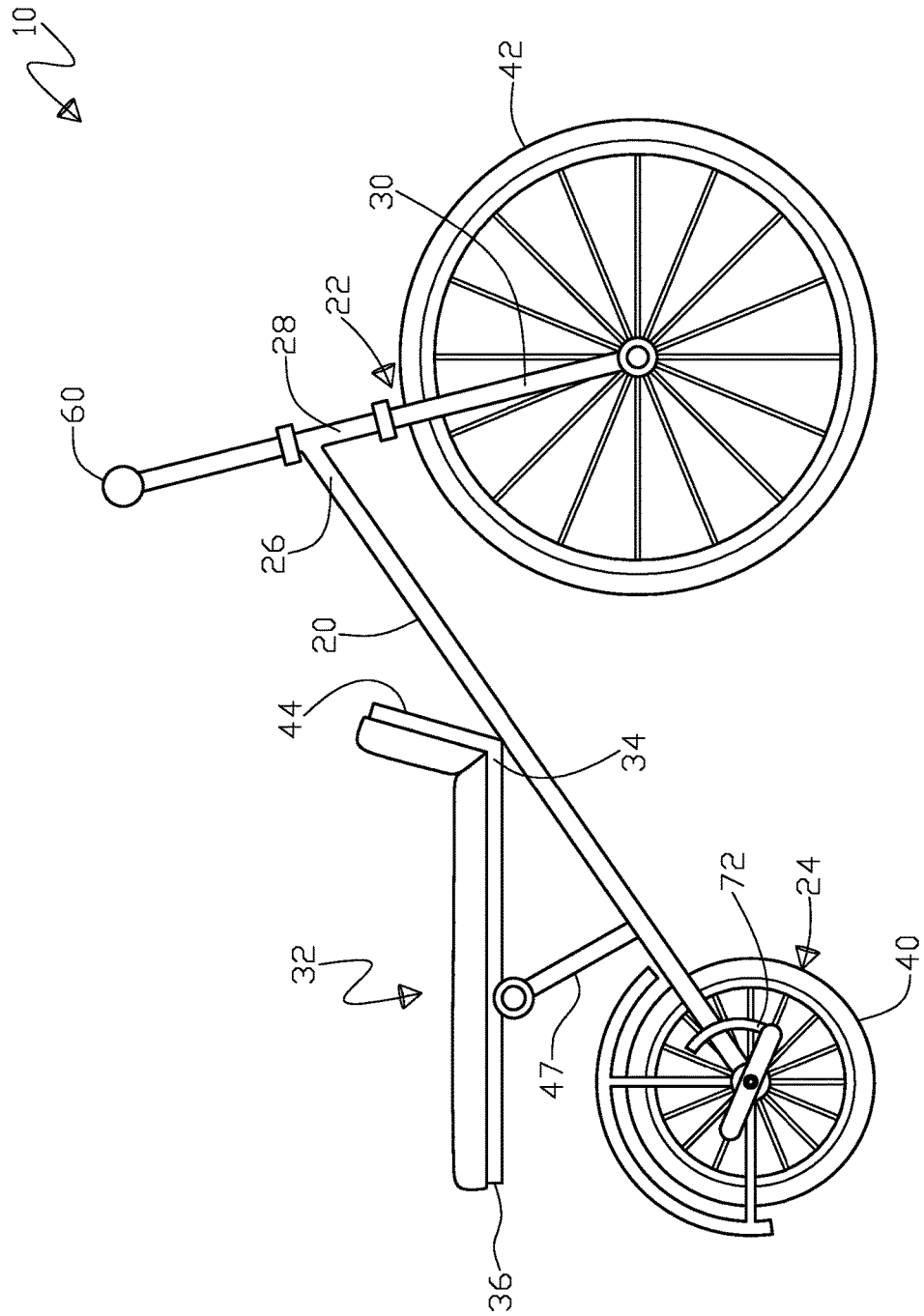
FIG. 1 is a side view of an example embodiment.

With reference now to the drawings, and in particular FIGS. 1 through 12 thereof, example of the instant kneel push cycle apparatus employing the principles and concepts of the present kneel push cycle apparatus and generally designated by the reference number 10 will be described.

Referring to FIGS. 1 through 12 a example embodiments of the kneel push cycle apparatus 10 are illustrated.

The present kneel push cycle apparatus 10 has been devised to enable voluble locomotion of a user kneeling upon a kneeling pad 32 disposed upon a frame member 20, said frame member 20 coupling a front wheel 42 and a rear wheel 40 in line for voluble travel thereon. The present kneel push cycle 10 is operable by a user kneeling upon one leg upon the kneeling pad 32, said user's hands grasping a handle bar 60 disposed to direct the front wheel 42, said user's other leg used to propel the kneel push cycle 10 at a desired velocity. There are no pedals, chains, gears, and no seat post common to bicycles presently seen in the art in the instant kneel push cycle apparatus 10.

The present kneel push cycle apparatus 10 enables voluble locomotion, disposed supporting a user kneeling upon one knee, wherein said user's weight is maintained off of a particular foot, or lower leg, said lower leg taken to include all the parts of a leg below the knee including, therefore, the foot, ankle, tibia and fibula of a respective leg and all associated musculature thereat, for example, whereby travel of a user is uninhibited by injury anywhere thereto. The present kneel push cycle apparatus 10, therefore, is usable as a support for locomotion subsequent an injury to the lower leg, or for recreation, as desired.

Figure 2:
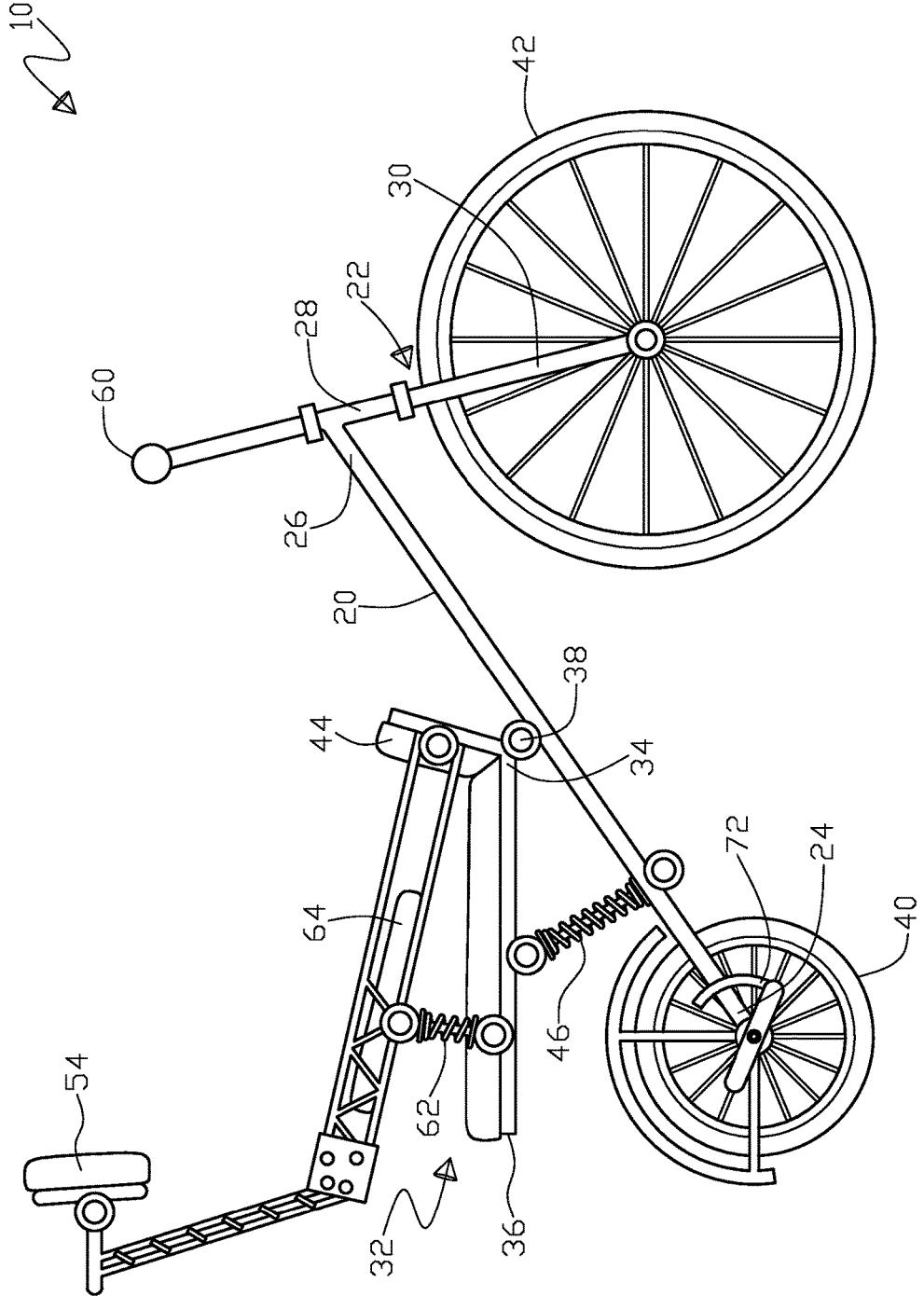
FIG. 2 is a side view of an example embodiment.

Referring to embodiments shown in FIGS. 1 and 2, the present kneel push cycle apparatus 10, therefore, includes a frame member 20 angled between a front fork 22 and a rear wheel 40. The rear wheel 40 is volubly centered at a posterior end 24 of the frame member 20. The front fork 22 is disposed at an anterior end 26 of the frame member 20, said front fork 22 pivotally disposed through a sleeve 28 thereat, whereby the front wheel 42 is directionally mounted to the frame member 20 and volubly centered between each of a pair of prongs 30 disposed upon the front fork 22. The front wheel 42 has a diameter greater than the rear wheel 40 whereby the frame member 20 is angled up from connection with the rear wheel 40 to connection with the front fork 22. The rear wheel 40 and/or the front wheel 42 may include a brake, as known in the art.

A kneeling pad 32 is disposed upon the frame member 20 between the front and rear wheels 42, 40. The kneeling pad 32 includes a front end 34 and a rear end 36. The kneeling pad 32 may be pivotally connected to the frame member 20 at a pivot joint 38 disposed at the front end 34 (as shown in FIG. 2, for example) or fixed to the frame member 20 at the front end 34 (as shown in FIG. 1, for example). An upward rest 44 is disposed angularly upward at the front end 34, said upward rest 44 disposed to contact the dorsal side of a user's thigh kneeling upon the kneeling pad 32. The rear end 36 is disposed overhanging the rear wheel 40.

As shown in FIG. 2, a suspension member 46 may be disposed upon the kneeling pad 32 and connected to the frame member 20 proximal the rear wheel 40, said suspension member 46 compressively supportive of the kneeling pad 32. In embodiments where the kneeling pad 32 is fixedly attached to the frame member 20, the suspension member 46 is omitted and a support bar 47 may be included upholding the kneeling pad 32 (see FIG. 1 for example). It is further contemplated as part of this invention that, in example embodiments practiced of the invention, the pivot joint 38 may be sprung against downward displacement itself, whereby the need of a separate suspension member or support bar is obviated and the kneeling pad is connected to the frame only at the pivot joint 38.

A user may ride the present kneel push cycle apparatus 10 with either leg kneeling upon the kneeling pad 32, as desired, whereby said user's other leg is usable to propel the device 10 forward. For comfort, a yielding or compressive surface may be disposed upon the kneeling pad 32 to conformably support a limb disposed thereupon. The kneeling pad 32 may include multiple members positional and adaptable to a particular foreleg, as desired. A foot rest 72 may be included on either side of the frame member 20 whereon a user may rest the striding leg subsequent propelling the kneel push cycle apparatus 10 at a desired velocity. The foot rest 72 may be foldable or attachable to the frame member 20.

Figure 3:
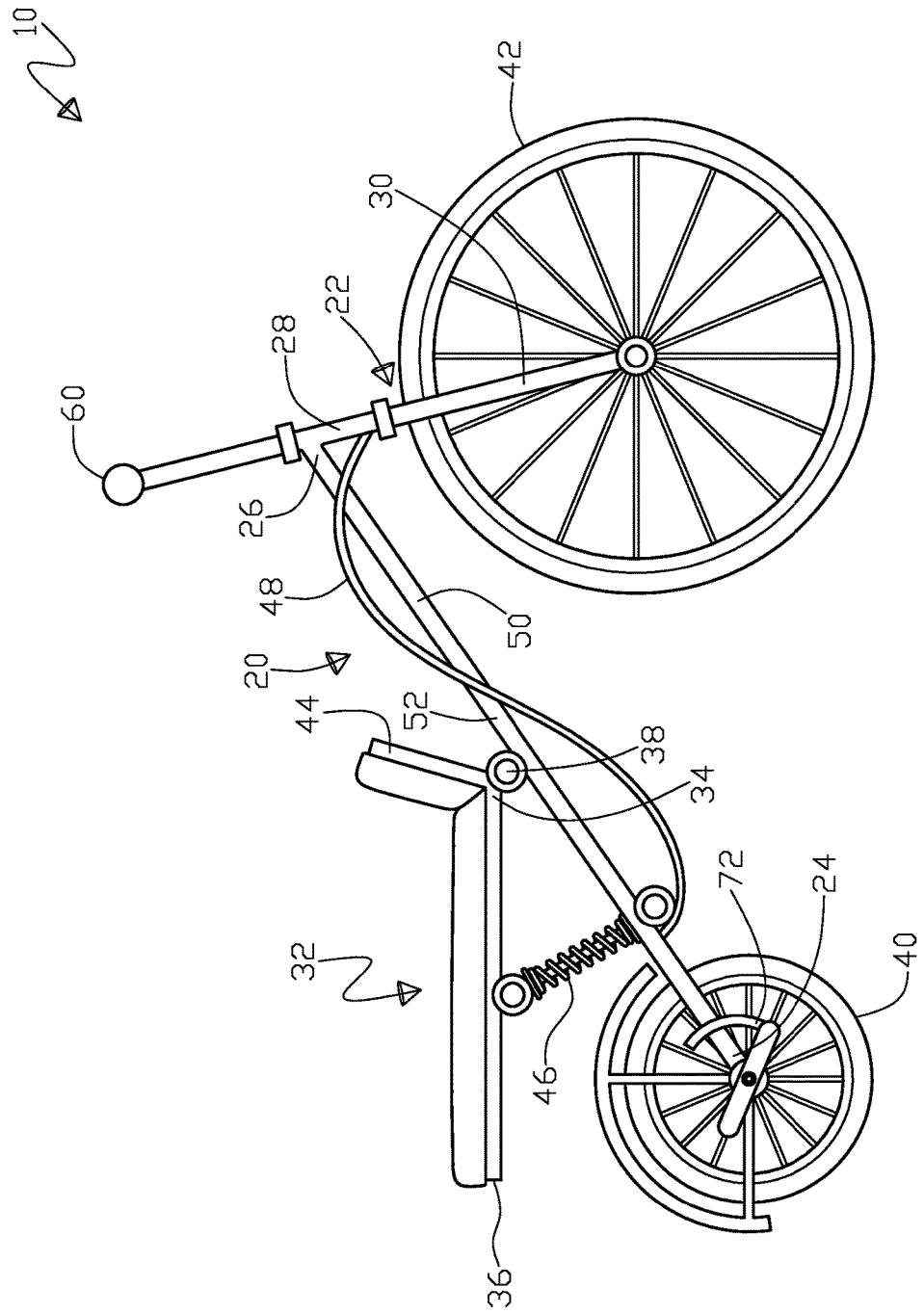
FIG. 3 is a side view of an example embodiment having an S-shaped portion additional to a frame member.
Figure 4:
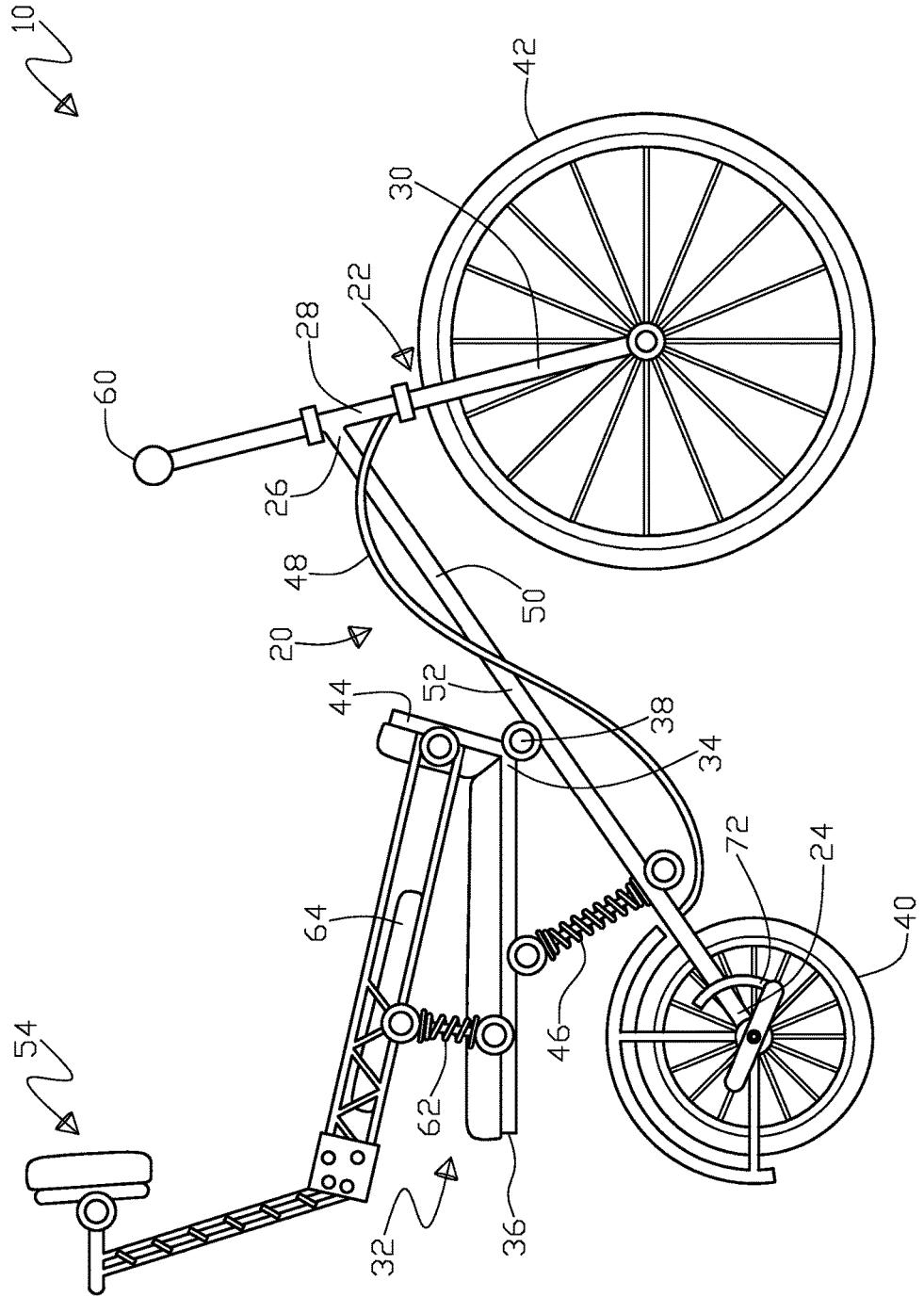
FIG. 4 is a side view of an example embodiment having an S-shaped portion additional to a frame member.
Figure 5:
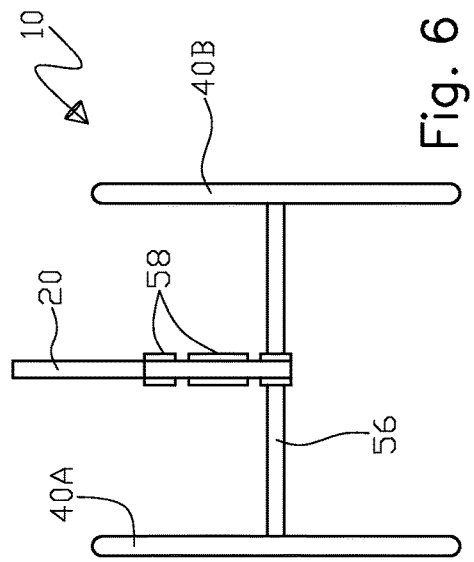
FIG. 5 is a top view of an example embodiment having a pair of rear wheels disposed endwise upon an articulated transverse beam with an inline bearing disposed on the frame member in conjunction with the transverse beam whereby each of the pair of rear wheels may be forcibly tilted off the perpendicular.
Figure 6:
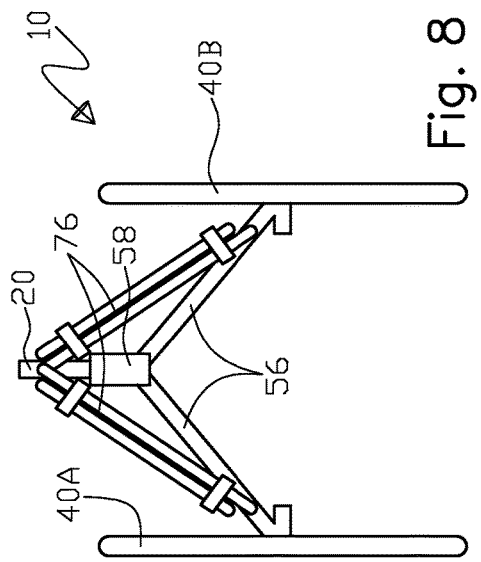
FIG. 6 is a top view of an example embodiment having a pair of rear wheels disposed endwise upon an articulated transverse beam with an inline bearing disposed on the frame member in conjunction with the transverse beam whereby each of the pair of rear wheels may be forcibly tilted off the perpendicular.
Figure 7:
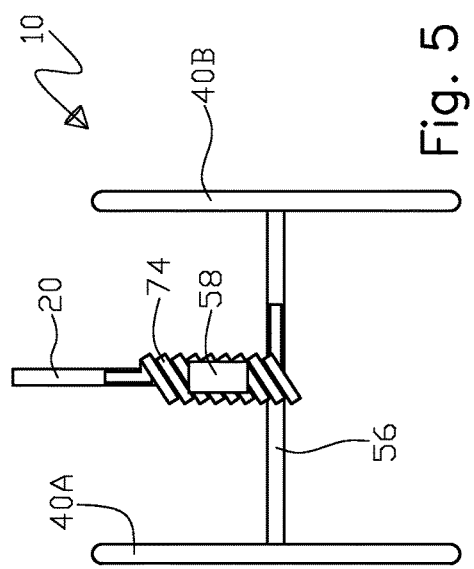
FIG. 7 is a top view of an example embodiment having a pair of rear wheels disposed endwise upon an articulated transverse beam and a pair of inline bearings (or leaf springs) disposed diagonally connected between the transverse beam and the frame member.

In an example embodiment shown in FIGS. 3 and 4, for increased tensile strength, the frame member 20 includes an S-shaped portion 48 disposed between the rear wheel 40 and the front wheel 42. A straight portion 50 is disposed on either side of the S-shaped portion 48. The S-shaped portion 48 undulates from a concave portion to a convex portion, crossing from a position disposed underneath the straight portion 50 to a position disposed above the straight portion 50 at a proximal midpoint 52 upon the frame member 20. The proximal midpoint 52 may be disposed proximally relative the pivot joint 38.

In another example embodiment of the present kneel push cycle apparatus 10, shown in FIGS. 2 and 4, a rearward pad 54 is disposed extensibly positional upon the kneeling pad 32, said rearward pad 54 disposed for contact against a lower back of a user kneeling upon the kneeling pad 32 and operating the kneel push cycle apparatus 10. The rearward pad 54 may be disposed connectable to a seating pad 64 disposed to overlie the kneeling pad 32 whereby a user may sit upon the seating pad 64, said user's kneeling leg thereby disposed between the kneeling pad 32 and the seating pad 64. The seating pad 64 may include a second suspension member 62 for compressive engagement against the weight of a user, as desired, to increase comfort and lessen knocks that might otherwise occur when traveling upon the present kneel push cycle apparatus 10, while maintaining a minimum distance between the kneeling pad 32 and the seating pad 64 during normal operation of the kneel push cycle apparatus 10 whereby a kneeling leg disposed therebetween is prevented from contacting the seating pad 64.

The rearward pad 54 and seating pad 64, therefore, enable supportive engagement to seat a user, and support the lower back of a user, when riding the kneel push cycle apparatus 10. The rearward pad 54 and seating pad 64, therefore, are usable to maintain the user's weight off of the kneeling leg, as may be desired. The rearward pad 54 and seating pad 64 may be attachable to the kneeling pad 32, as desired, whereby the present kneel push cycle apparatus 10 is operable with and alternately without the seating pad 64 and rearward pad 54, as desired.

In another embodiment shown in FIGS. 5 through 8, a pair of rear wheels 40A, 40B is contemplated disposed upon the posterior end 24 of the frame member 20 at either end of an articulated transverse beam 56, said articulated transverse beam 56 pivotally connected centrally to each of the pair of rear wheels 40A, 40B at an inline bearing 58 wherein angular displacement of each of the pair of rear wheels 40A, 40B is enabled relative the kneel push cycle apparatus 10 frame member 20 and thereby enabling the frame member 20 to effectively twist relative the position of the rear wheels 40A, 40B when centripetal force effected during a turn, for example, is occurrent at the wheels 40A, 40B.

The term "inline bearing", as used herein, is taken to include structure enabling rotational and pivotal action in torsion against a spring member 74 (FIG. 5) or a torsion bar spring leaf system 76 (FIGS. 7 and 8) whereby the pair of wheels 40A, 40B are righted back to the perpendicular relative the frame member 20 by action of the spring member 74 or torsion bar leaf spring system 76 once forcing off the perpendicular ceases. Thus the inline bearing 58 enables absorption of force effected during a turn, for example, and enables righting of the frame member 20 relative the pair of wheels 40A, 40B once forcing discontinues.

Each of the pair of rear wheels 40A, 40B is therefore afforded some tilt off the perpendicular relative the transverse beam 56 and/or frame member 20 when forced by angular momentum during turning of the kneel push cycle apparatus 10, whereby each of said pair of rear wheels 40A, 40B is enabled maintained contact with a ground surface during operation of the kneel push cycle apparatus 10 through a turn, the centripetal force exerted at each wheel 40A, 40B being absorbed by the inline bearing 58 at the articulated transverse beam 56 and then released by action of the spring member 74 or torsion bar leaf spring system 76 subsequent execution of the turn.

In example embodiments shown in FIGS. 5 through 8, each of the pair of rear wheels 40A, 40B is contemplated disposed fairly close together, the transverse beam 56 having a length approximately six inches, whereby a user's leg striding to propel the device 10 is not obstructed by the position of said pair of rear wheels 40A, 40B.

Figure 8:
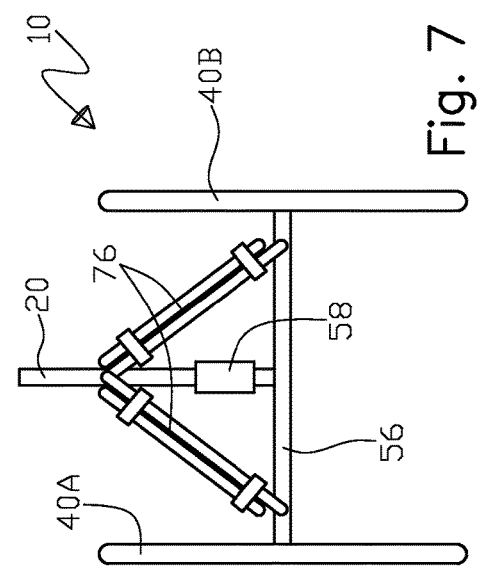
FIG. 8 is a top view of an example embodiment having a pair of rear wheels disposed endwise upon a diagonally rendered articulated transverse beam, said transverse beam disposed in diagonal array from the posterior end of the frame member.

Referring to embodiments shown in FIGS. 8 and 9, the transverse beam 56 is forked and therefore may be angled upwards or downwards relative the center of the rear wheels 40A, 40B (see FIG. 8) or a split frame member 20 enables position of the rear wheels 40A, 40B without the transverse beam 56, as will be described subsequently (see FIG. 9).

Figure 9:
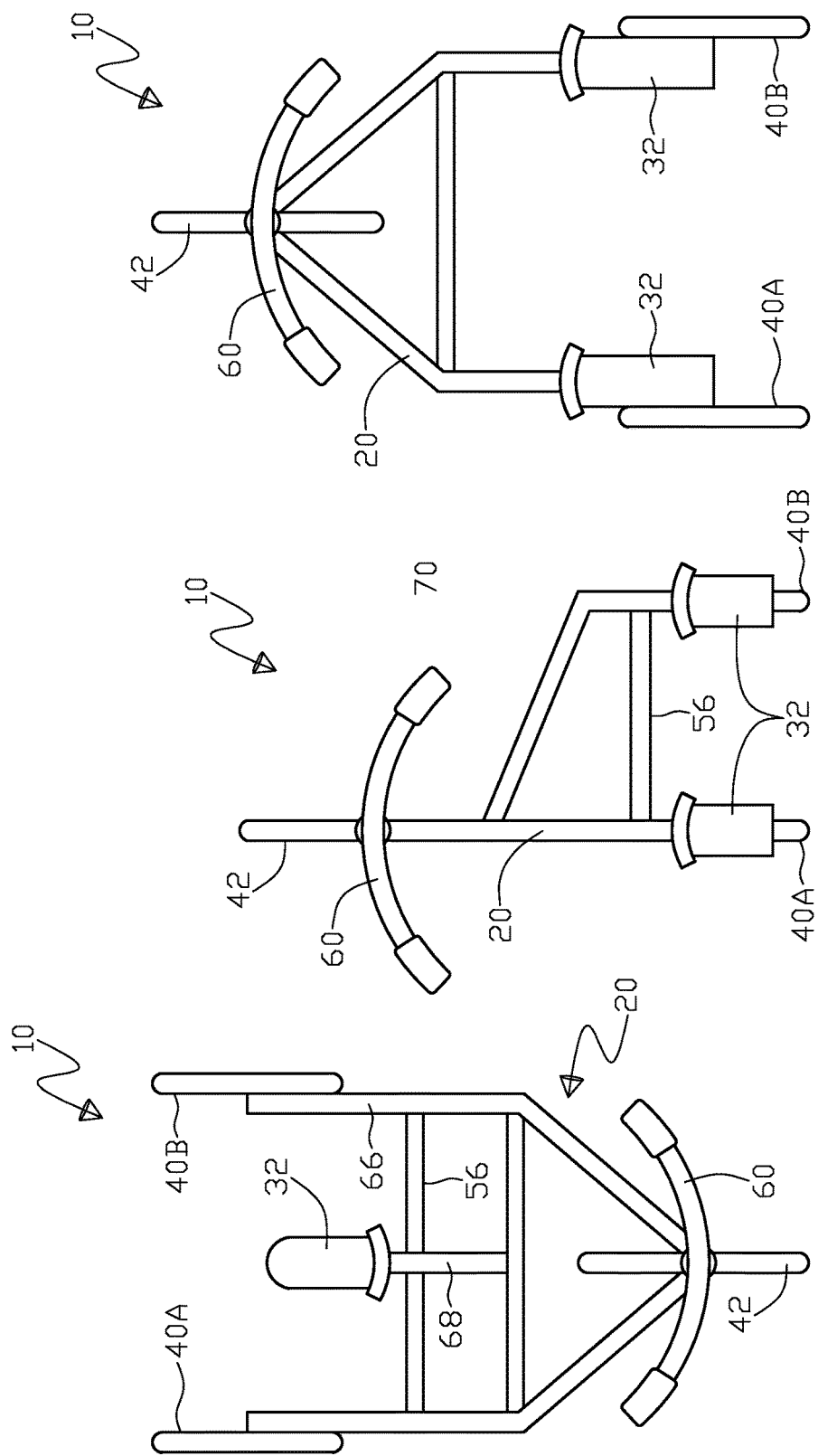
FIG. 9 is a top view of an example embodiment having a pair of rear wheels disposed endwise upon a split frame.

In the example embodiment shown in FIG. 9, each of the pair of rear wheels 40A, 40B is disposed endwise at the posterior end 24 of a split frame member 20. The split frame member includes a pair of parallel portions 66 and a central portion 68. Each of the pair of parallel portions 66 is longer than the central portion 68 whereby the rear wheels 40A, 40B are maintained rearwards of the kneeling pad 32 which is disposed upon the central portion 68.

Figure 10:
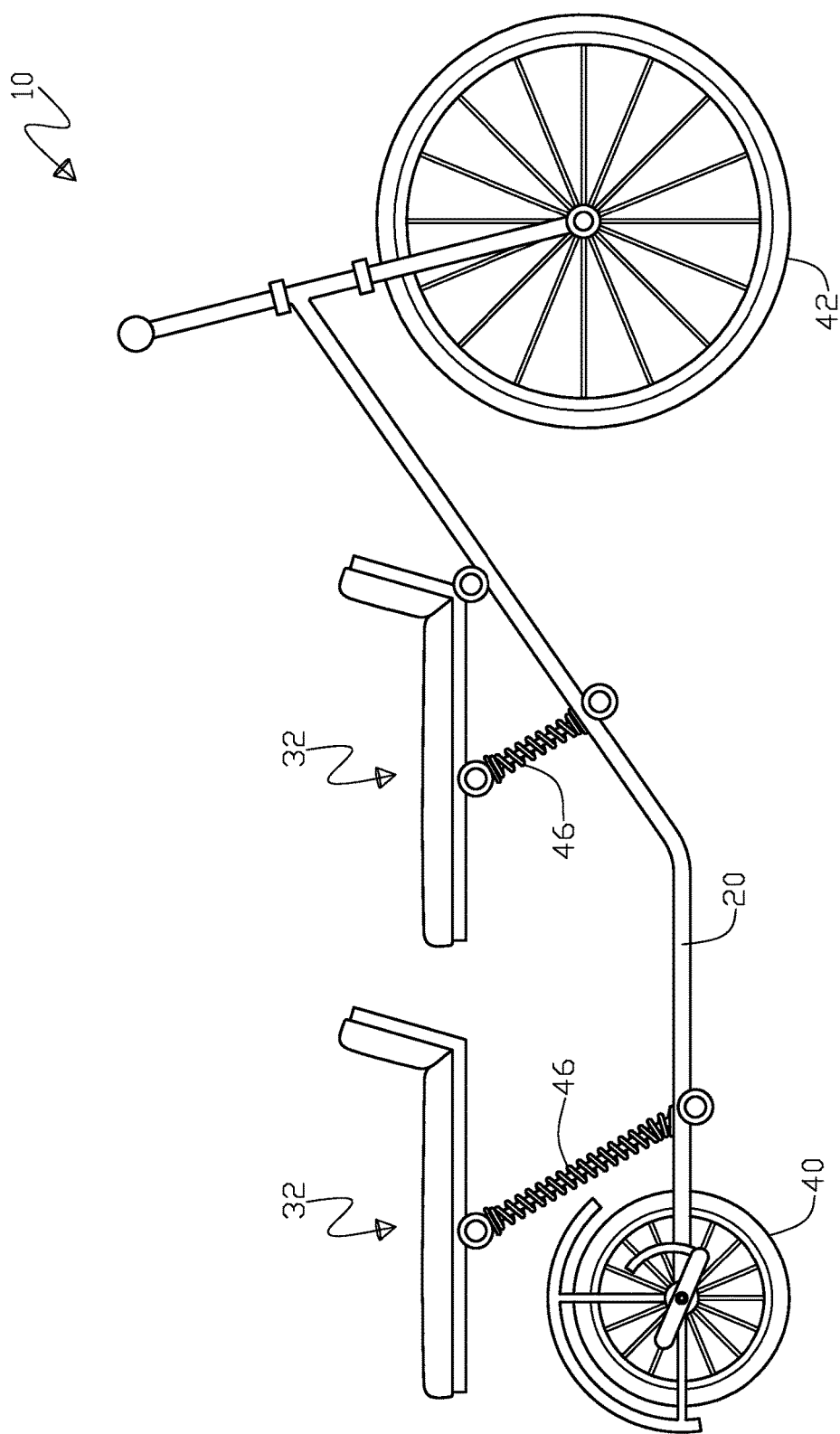
FIG. 10 is a side view of an example embodiment having a pair of kneeling pads disposed upon an elongated frame member appropriate for tandem use of two users.

FIG. 10 illustrates a tandem arrangement of kneeling pads 32 disposed upon an elongated frame member 20. In this embodiment a pair of riders may ride together upon the same kneel push cycle apparatus 10 when desired.

FIG. 11 illustrates an example embodiment wherein an adjunct frame member 70 is disposed adjacent the frame member 20 wherein a second kneeling pad 32 is disposed adjacently for tandem use, when desired. The adjunct frame member 70 may be attachable to the frame member 20 whereby tandem use is rendered optional by connection of the adjunct frame member 70 as a sidecar.

FIG. 12 illustrates an example embodiment wherein each of a pair of kneeling pads 32 is disposed endwise upon a split frame member 20 whereby tandem use is enabled.

In all embodiments, the present kneel push cycle apparatus 10 enables supported locomotion of a user kneeling upon one knee disposed upon the kneeling pad 32, whereby the kneel push cycle 10 is expediently operable to effect travel, as desired, in lieu of crutches, or other ambulatory aids. The present kneel push cycle 10 may be used recreationally, as desired, to travel in a kneeling position with one leg used to propel the device at a desired velocity, as desired.

What is claimed is:

1. A kneel push cycle apparatus comprising:
a frame member having a posterior end and an anterior end;
a front fork rotatably disposed at the anterior end, said front fork directable by a handle bar;
a front wheel disposed at the front fork;
at least one rear wheel disposed at the posterior end;
a kneeling pad attached to the frame member, said kneeling pad having a front end and a rear end, said kneeling pad projected rearwards over the posterior end of the frame member in a plane parallel with a ground surface atop which the kneel push cycle apparatus is caused to travel; and
a seating pad angularly disposed connected to the front end of the kneeling pad;
wherein a user kneeling upon the kneeling pad with one leg is capable of comfortably propelling the kneel push cycle apparatus by striding action of the other leg against an underlying ground surface and directing said kneel push cycle apparatus by manual action at the handle bar.

2. The kneel push cycle apparatus of claim 1 wherein the kneeling pad is pivotally attached to the frame member at a pivot joint disposed thereon.

3. The kneel push cycle apparatus of claim 2 wherein a suspension member is disposed between the kneeling pad and the frame member, said suspension member compressively engageable therebetween accommodative of a user's weight thereatop.

4. The kneel push cycle apparatus of claim 1 wherein the kneeling pad includes an upward rest disposed at the front end thereof, said upward rest disposed for engagement against a dorsal side of a user's thigh.

5. The kneel push cycle apparatus of claim 4 wherein the at least one rear wheel has a lesser diameter than the front wheel whereby the frame member is angled upwards from the rear wheel to the front fork and the kneeling pad is disposed overhanging the at least one rear wheel.

6. The kneel push cycle apparatus of claim 4 wherein the seating pad is angularly disposed connected to the upward rest of the front end of the kneeling pad.

7. The kneel push cycle apparatus of claim 6 further comprising a rearward pad extensibly disposed upon the seating pad, said rearward pad disposed for supportive contact against a user's back.

8. The kneel push cycle apparatus of claim 7 further comprising a rearward pad extensibly disposed upon the seating pad, said rearward pad disposed for supportive contact against a user's back.

9. A kneel push cycle apparatus comprising:
a frame member having a posterior end and an anterior end;
a front fork rotatably disposed at the anterior end, said front fork directable by a handle bar;
a front wheel disposed at the front fork;
at least one rear wheel disposed at the posterior end;
a kneeling pad pivotally attached to the frame at a pivot joint thereon, said kneeling pad having a front end and a rear end, said kneeling pad projected rearwards over the posterior end of the frame member in a plane parallel with a ground surface atop which the kneel push cycle apparatus is caused to travel; and
a suspension member disposed between the kneeling pad and the frame member, said suspension member compressively engageable therebetween accommodative of a user's weight thereatop; and
a seating pad angularly pivotally disposed connected to the front end of the kneeling pad;
wherein a user kneeling upon the kneeling pad with one leg is capable of comfortably propelling the kneel push cycle apparatus by striding action of the other leg against an underlying ground surface and directing said kneel push cycle apparatus by manual action at the handle bar.

10. The kneel push cycle apparatus of claim 9 wherein the kneeling pad includes an upward rest disposed at the front end thereof, said upward rest disposed for engagement against a dorsal side of a user's thigh.

11. The kneel push cycle apparatus of claim 10 wherein the at least one rear wheel has a lesser diameter than the front wheel whereby the frame member is angled upwards from the rear wheel to the front fork and the kneeling pad is disposed overhanging the at least one rear wheel.

12. The kneel push cycle apparatus of claim 10 where the seating pad is disposed upon a second suspension member attached to the kneeling pad more proximal the rear end.

13. The kneel push cycle apparatus of claim 12 further comprising a rearward pad extensibly disposed upon the seating pad, said rearward pad disposed for supportive contact against a user's back.

14. A kneel push cycle apparatus comprising:
- a frame member having a posterior end and an anterior end;
- a front fork rotatably disposed at the anterior end, said front fork directable by a handle bar;
- a front wheel disposed at the front fork;
- at least one rear wheel disposed at the posterior end, said at least one rear wheel having a diameter less than a diameter of the front wheel;
- a kneeling pad pivotally attached to the frame at a pivot joint thereon, said kneeling pad having a front end and a rear end, said kneeling pad projected rearwards over the posterior end of the frame member in a plane parallel with a ground surface atop which the kneel push cycle apparatus is caused to travel;
- an upward rest disposed upon the front end of the kneeling pad, said upward rest disposed for contact against a dorsal side of a user's thigh;
- a seating pad angularly pivotally disposed connected to the upward rest at the front end of the kneeling pad;
- a suspension member disposed between the kneeling pad and the frame member, said suspension member compressively engageable therebetween accommodative of a user's weight thereatop; and
- each of a pair of foot rests disposed upon the frame member;
- wherein a user kneeling upon the kneeling pad with one leg is capable of comfortably propelling the kneel push cycle apparatus by striding action of the other leg and directing said kneel push cycle apparatus by manual action at the handle bar.

\* \* \* \* \*